May 29, 1962 G. D. WILLIAMSON, JR 3,036,839
GRINDING WHEEL CHUCK
Filed Aug. 20, 1959
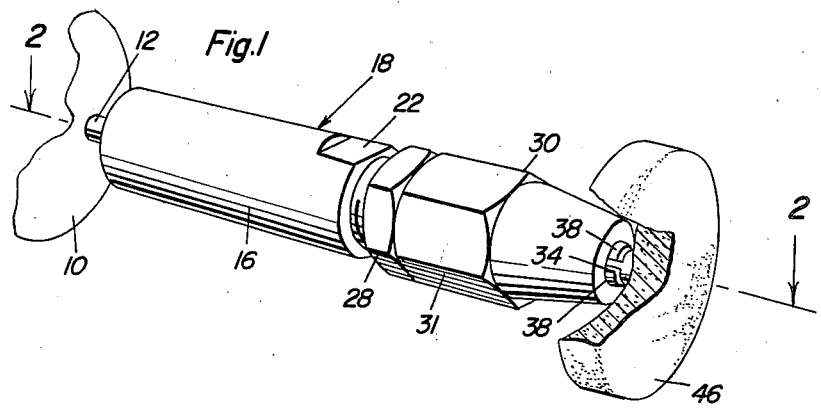
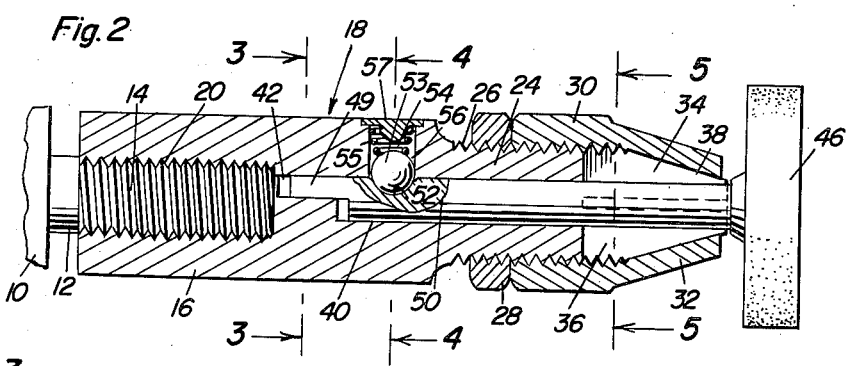
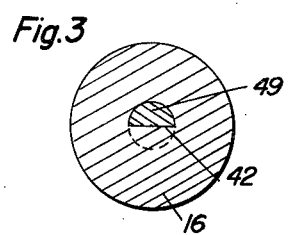
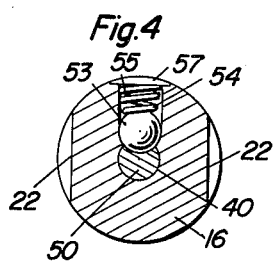
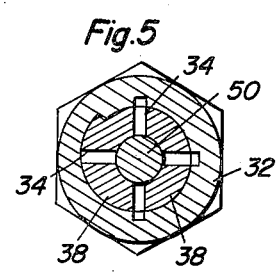
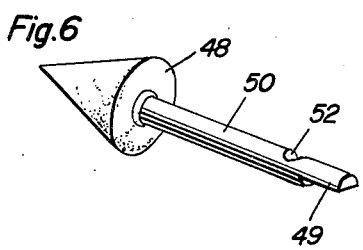
George D. Williamson, Jr.
INVENTOR.
BY Clarence A. O'Brien
and Harvey B. Jacobson
Attorneys

United States Patent Office 3,036,839
Patented May 29, 1962

3,036,839
GRINDING WHEEL CHUCK
George D. Williamson, Jr., 107 W. Park Ave.,
Columbiana, Ohio
Filed Aug. 20, 1959, Ser. No. 835,044
5 Claims. (Cl. 279—24)

This invention relates to tools and more particularly to a grinding wheel chuck or holder.

An object of the invention is to provide a grinding wheel chuck which will allow an operator to insert grinding wheels a number of times without dressing the wheels each time that they are inserted. The chuck disposes of the now present use of two wrenches to tighten the grinder stem into the holder, since the operator using my chuck may simply pull out the grinding wheel and insert another in its place. Consequently, the chuck in accordance with the invention is a time saver allowing the operator to insert grinding wheels a number of times without dressing the wheels each time that they are inserted. This obviously results in less dressing away of grinding wheels.

Briefly, the chuck in accordance with the invention includes a body with wrench flats in order to hold the body while adjusting the spindle receiving end thereof. The spindle is of special construction, being provided with a recess intermediate the ends thereof within which a ball detent is adapted to engage, together with a tang which fits within a slot in the bore of the spindle receiving end of the body. Consequently, it is a very simple matter to remove the grinding wheel spindle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the chuck showing it attached to a conventional motor or motor driven device.

FIGURE 2 is a sectional view taken on the line 2—2 of FIGURE 1.

FIGURE 3 is a sectional view taken on the line 3—3 of FIGURE 2.

FIGURE 4 is a sectional view taken on the line 4—4 of FIGURE 2.

FIGURE 5 is a sectional view taken on the line 5—5 of FIGURE 2.

FIGURE 6 is a perspective view of a typical grinding wheel and a spindle attached to the grinding wheel, it being understood that various configurations of grinding wheels may be adopted, for instance as shown also in FIGURE 1.

In the accompanying drawings there is illustrated a motor 10 which diagrammatically represents any type of power device such as a drill, lathe, etc. The only requirement is that there be an output power shaft 12 from which torque may be obtained. Preferably shaft 12 has a threaded extremity 14 (FIGURE 2) on which the body 16 of chuck 18 may be attached by turning the shaft extremity 14 into the threaded bore 20 at one end of the chuck body 16. The bore 20 is coincident with the longitudinal axis of the body 16, and there are wrench flats 22 on the exterior of the body to hold it as will become evident subsequently.

The outer end of the body 16 has a reduced diameter part 24 with an external thread 26 thereon. Nut 28 is mounted on reduced part 24, and there is an internally threaded ferrule 30 also on reduced part 24 of body 16. Nut 28 backs up the ferrule, and the ferrule has an end 32 in the form of a hollow truncated cone. The extreme end 36 of body 16 has a number of slots 34 therein so that it is isolated into a plurality of segments 38 with a degree of inherent resilience so that they may be squeezed together when the ferrule 30 is tightened on the end 24 of body 16. The ferrule 30 can be adjusted by using a wrench on flats 31, and jam nut 28 may be used to lock the ferrule in proper position and keep it from rotating. To remove the grinding wheel, the wheel is pulled out and a new wheel inserted, this procedure requiring no wrenches.

There is a passage 40 on the longitudinal axis of body 16 and coaxial with bore 20. The passage 40 extends through the segmented extremity of body 16 and has a reduced part 42 forming a slot of semi-circular cross-section.

Typical grinding wheel 46 or typical grinding wheel 48 is attached to spindle 50. This spindle is circular in cross-section, except for a tang 49 at the end thereof opposite to that to which the grinding wheel is fixed. The tang 49 is of a cross-sectional shape to fit neatly within slot or reduced part 42 in order to prevent rotation of the body 16 with respect to spindle 50. There is a recess 52 in spindle 50 intermediate the ends thereof and within which ball detent 54 is adapted to engage. The ball detent is carried by the body 16 by being located in a passageway 56 at right angles to the longitudinal axis of passage 40 and intersecting passage 40 intermediate the ends thereof. Detent 54 is made of captive ball 53, pressed by spring 55 inwardly of passage 40. Cap 57 in passageway 56 forms an abutment for spring 55.

In use and operation, it is assumed that an operator desires to insert a grinding wheel in chuck 18. He simply slips spindle 50 into passage 40 making sure that the tang 49 fits into the slot 42. The ball detent 54 will automatically snap into the recess 52 to prevent the spindle from moving axially. The tang 49 fitting in slot 42 will prevent relative rotation between spindle 50 and body 16. Then ferrule 30 can be adjusted by using the wrench flats 31 on the side thereof, and the jam nut 28 can be used to lock the ferrule in proper position and help it from rotating. When the ferrule is tightened, the segments 38 are moved toward the spindle 50. Correct positioning of the segments 38 places them closely adjacent the spindle 50 with just enough clearance between the segments 38 and spindle 50 to enable the latter to be slid in and out of the chuck 18. Therefore, in order to replace the grinding wheel it is simply pulled out (no wrenches used) and a new wheel can then be inserted.

It is evident that any configuration of grinding wheel may be used and that the chuck or holder described herein materially facilitates the quick removal and replacement of grinding wheels plus their spindles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a chuck including an elongated body having means on one end adapted to secure said body to a driving shaft in axial alignment with the latter, a longitudinal bore formed in the other end of said body and having an inner end, the other end of said body including a plurality of resilient circumferentially spaced and longitudinally extending segments having free end portions and whose inner surfaces define the outer end of said bore, means for inwardly and radially adjustably positioning the free end portions of said segments, a rotational cutting tool having an axially extending circular cross-sectional spindle with a free end slidably received in said bore, the free end of said spindle having a tang eccentric from the longitudinal axis of said spindle, the inner end of said bore including a laterally offset slot slidably receiving said tank establishing a rotational drive connection between said body and said spindle, spring detent means carried by said body and communicating with the inner end portion of said bore, and a radially and outwardly opening recess in said shank for engagement by said detent means yieldably preventing axial movement of said shank in said bore upon movement of said shank into an operational position within said bore with tang received in said slot.

2. The combination of claim 1 wherein said spring detent means communicates with the exterior of said body.

3. A grinding wheel assembly comprising an elongated body having a smooth, cylindrical, exterior surface, an internally threaded axial bore in one end of said body for mounting the latter in axial alignment upon a power operated driving shaft, a passage in the other end of said body coaxial with but terminating in spaced relation to said bore, said body having a partition disposed between said bore and passage, said partition having a slot therethrough eccentric to said bore and passage and communicating with each, a grinding tool having an elongated spindle with a tang extending axially from and eccentrically of said spindle, said tang being slidably received in said slot when said stem is slidably received in said passage, frictional retaining means engaging said body and said spindle and resisting axial displacement of said spindle in said passage.

4. The combination of claim 3 wherein said retaining means includes a chamber in said body communicating with said passage, a detent surface on said spindle, a detent in said chamber movable into said passage and into engagement with said detent surface, resilient means in said chamber yieldingly biasing said detent towards said passage, said chamber and detent being disposed in said body at a position remote to and spaced from said partition.

5. The combination of claim 3 wherein said body has at said other end an externally threaded diametrically reduced portion terminating in conical, radially resilient fingers surrounding said passage, a locking gland threaded upon said reduced portion and having a conical interior surface compressively gripping a spindle in said passage.

References Cited in the file of this patent
UNITED STATES PATENTS

| | | |
|---|---|---|
| 1,425,270 | Morgan | Aug. 8, 1922 |
| 1,701,172 | Brown | Feb. 5, 1929 |
| 2,092,060 | Gairing | Sept. 7, 1937 |